(12) United States Patent
Lin et al.

(10) Patent No.: US 9,749,184 B2
(45) Date of Patent: Aug. 29, 2017

(54) CLOUD DEVICE AND METHOD FOR NETWORK DEVICE DISCOVERING

(71) Applicant: HON HAI PRECISION INDUSTRY CO., LTD., New Taipei (TW)

(72) Inventors: Jui-Lung Lin, New Taipei (TW); Pei-Ling Chen, New Taipei (TW); Zhen-Hong Wu, New Taipei (TW); Kuo-Yuan Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 45 days.

(21) Appl. No.: 14/196,592

(22) Filed: Mar. 4, 2014

(65) Prior Publication Data

US 2014/0258510 A1    Sep. 11, 2014

(30) Foreign Application Priority Data

Mar. 11, 2013 (TW) .............................. 102108473 A

(51) Int. Cl.
| | |
|---|---|
| *G06F 15/173* | (2006.01) |
| *H04L 12/24* | (2006.01) |
| *H04L 29/12* | (2006.01) |

(52) U.S. Cl.
CPC ........ *H04L 41/12* (2013.01); *H04L 29/12009* (2013.01); *H04L 29/12367* (2013.01); *H04L 29/12462* (2013.01)

(58) Field of Classification Search
CPC . H04L 29/12462; H04L 41/12; H04L 61/255; H04L 29/12009; H04L 29/12377; H04L 41/085; H04L 41/0853; H04L 41/0866; H04L 61/2015; H04L 61/2503; H04L 61/2575; H04L 61/6095; H04L 29/12367; H04L 61/2514; H04L 65/1069; H04L 12/66; H04L 29/12528; H04L 29/12537
USPC ........ 709/223, 224, 226, 229, 245; 370/241, 370/252, 352, 356, 401
See application file for complete search history.

(56) References Cited

U.S. PATENT DOCUMENTS

| | | | |
|---|---|---|---|
| 7,068,646 B2 * | 6/2006 | Fangman | .......... H04L 29/06027 370/352 |
| 2004/0003076 A1 * | 1/2004 | Hishimoto | .............. H04L 41/12 709/223 |

(Continued)

*Primary Examiner* — Dustin Nguyen
*Assistant Examiner* — Hao Nguyen
(74) *Attorney, Agent, or Firm* — Steven Reiss

(57) ABSTRACT

A network device discovery method receives registration information from the network devices which are registered to the cloud device, and generates a management list for recording the registration information and a management status of each of the registered network devices. When a request of searching for specified network devices of a specified network manager from a specified client device is received, the discovery method retrieves specified network devices managed by the specified network manager from the management list. The discovery method further searches for target network devices which have the same public Internet Protocol (IP) addresses with the specified network devices, and presents one or more target network devices which have not been managed by any network manager to the specified client device for the specified network manager.

18 Claims, 3 Drawing Sheets

(56) References Cited

U.S. PATENT DOCUMENTS

| | | | |
|---|---|---|---|
| 2004/0017818 A1* | 1/2004 | Chung | H04L 29/06027 370/401 |
| 2007/0005738 A1* | 1/2007 | Alexion-Tiernan et al. | 709/223 |
| 2008/0101357 A1* | 5/2008 | Iovanna et al. | 370/389 |
| 2008/0101552 A1* | 5/2008 | Khan | H04L 12/66 379/45 |
| 2009/0265473 A1* | 10/2009 | Hydrie | H04L 67/104 709/229 |
| 2010/0287371 A1* | 11/2010 | Vogt | H04L 29/12311 713/162 |

\* cited by examiner

CLOUD DEVICE AND METHOD FOR NETWORK DEVICE DISCOVERING

BACKGROUND

1. Technical Field

Embodiments of the present disclosure relate to discovering technology, and particularly to a cloud device and method for network device discovering.

2. Description of Related Art

A plurality of network devices in a large company may belong to different network segments of one or more networks. A network manager manages the network devices of different network segments according to a predetermined authorization. If a network manager logins on a client device, the client device only can discover network devices in the same network segment with the client device, and present the discovered network devices to the network manager. The network manager needs to check device information of the discovered network devices in sequence. The network manager further needs to determine one or more target network devices which have not been managed by any network manager from the searched network devices, and make the specified network devices managed by the network manager. It is inconvenient and inefficient for the network manager to discover available network devices to be managed.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable media or storage medium. Some non-limiting examples of a non-transitory computer-readable medium include CDs, DVDs, flash memory, and hard disk drives.

Figure 1:
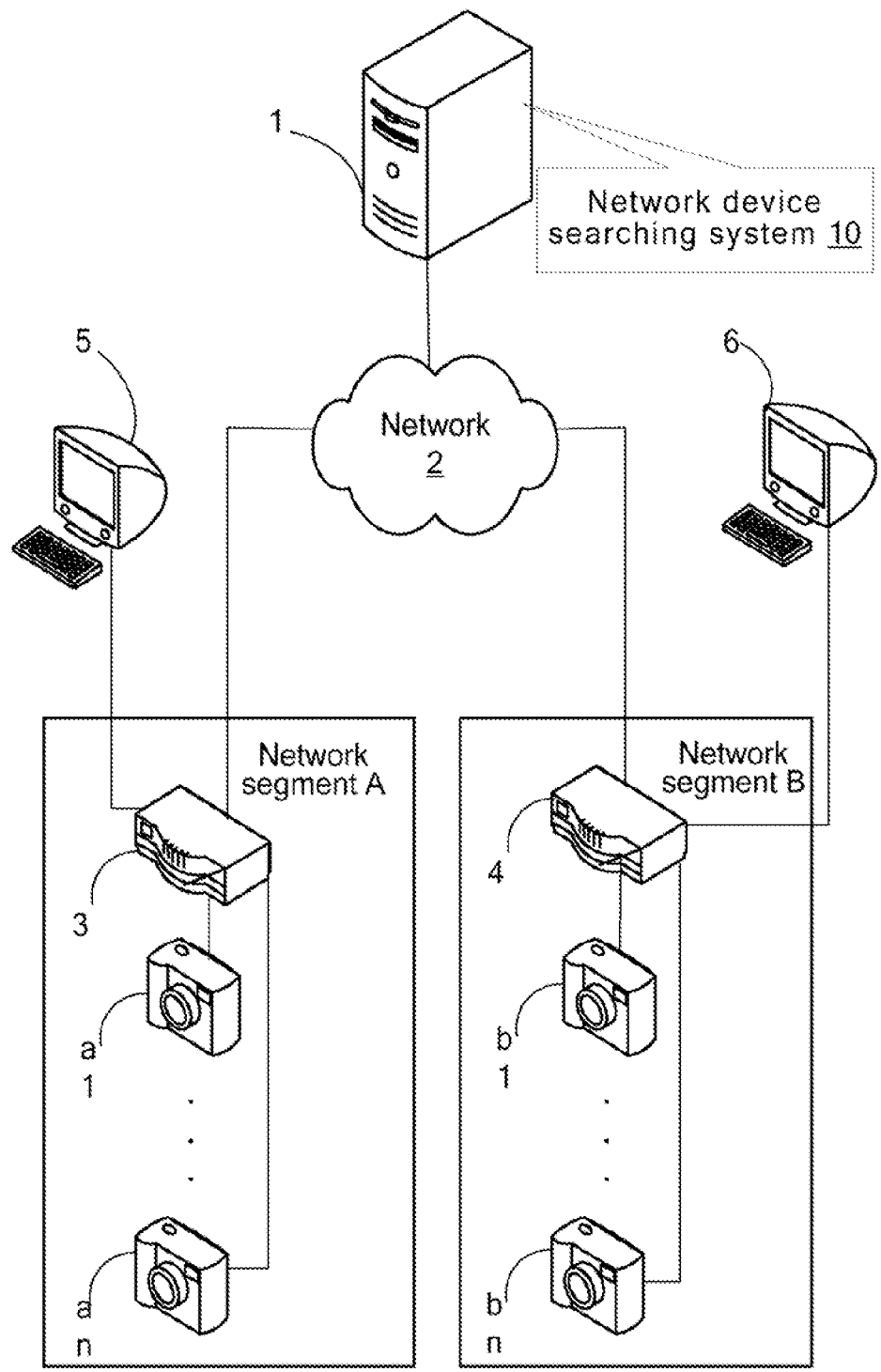
FIG. 1 is a schematic diagram of one embodiment of a cloud device including a network device discovery system.

FIG. 1 is a schematic diagram of one embodiment of a cloud device 1 including a network device discovery system 10. The cloud device 1 is connected to a plurality of network devices in different network segments through a network 2 (e.g. a cloud network). For example, the network devices "a1~an" are in a network segment "A", and the network devices "b1~bn" are in a network segment "B". The network devices "a1~an" in the network segment "A" are connected to the network 2 through a network address translating (NAT) device 3, and the network devices "b1~bn" in the network segment "B" are connected to the network 2 through a NAT device 4. In one embodiment, the network devices may be network cameras or any other network devices.

In one embodiment, the NAT devices 3, 4 are used to translate a private Internet Protocol (IP) address into a public IP address. The private IP address is an IP address of a private network, and the public IP address is a globally unique IP address in the Internet. For example, network devices "a1" and "a2" in the network segment "A" respectively have a private IP address "D1" and "D2". After the NAT device 3 receives a data packet to be sent to the network 2 from the network device "a1" or "a2", the NAT devices 3 translates the private IP address "D1" or "D2" in the data packets to be a public IP address "M1" of the network segment "A." The NAT device 3 further records the private IP address "D1" or "D2" of the network devices "a1" or "a2" which transmits the data packet.

A network manager (e.g. a person having an account and passwords) may login on a client device to check network devices managed by the client device. For example, the network manager may login on a client device 5 in the network segment "A", or login on a client device 6 in the network segment "B". In one embodiment, a network manager "U1" can manage the network devices "a1~a5" in the network segment "A", and the network devices "b8~b12" in the network segment "B" according to a predetermined authorization.

Figure 2:
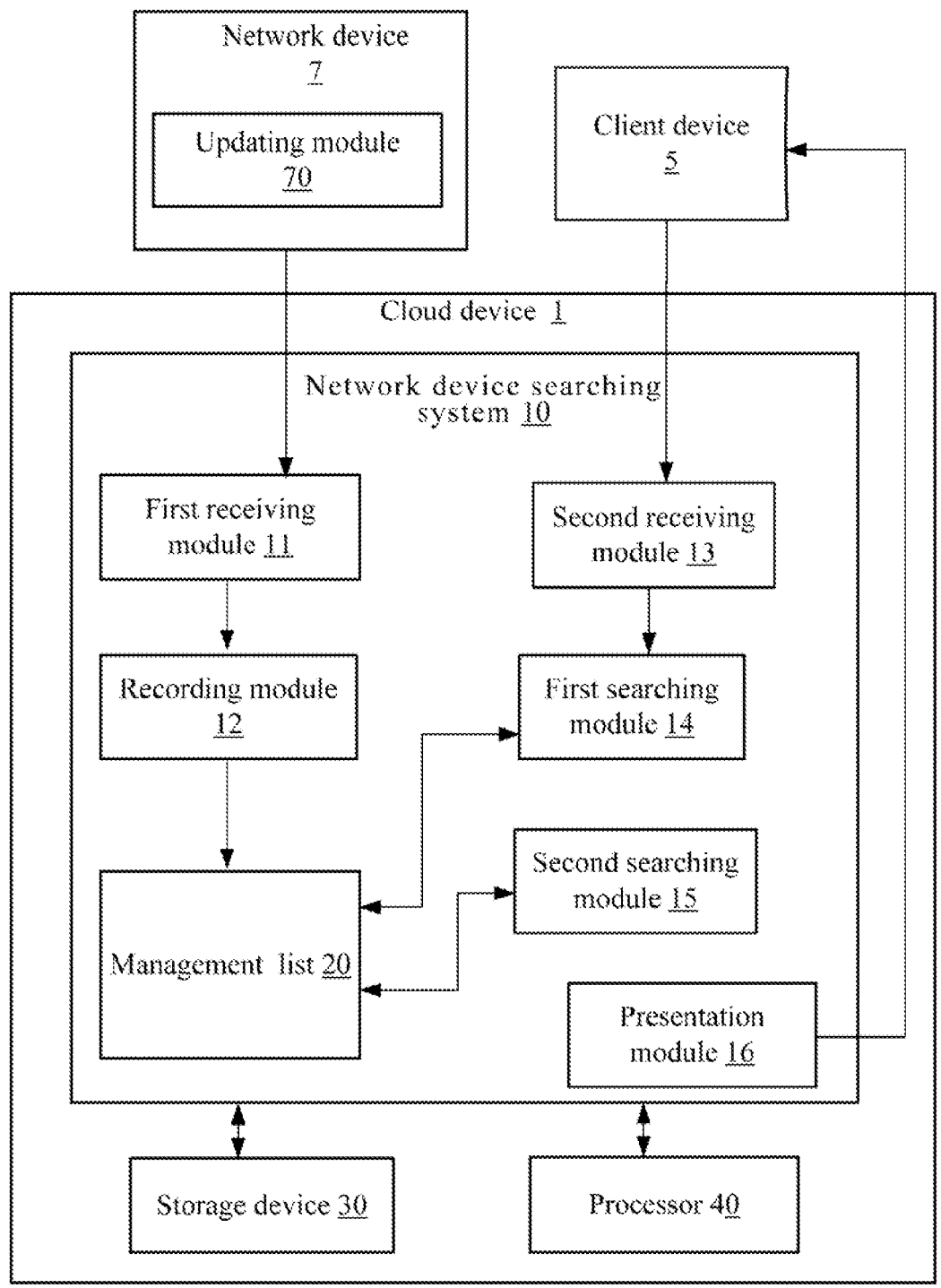
FIG. 2 is a block diagram of one embodiment of function modules of the network device discovery system included in the cloud device of FIG. 1.

FIG. 2 is a block diagram illustrating function modules of the network device discovery system 10 in the cloud device 1 of FIG. 1. In the embodiment, the network device discovery system 10 of the cloud device 1 includes a first receiving module 11, a recording module 12, a second receiving module 13, a first discovering module 14, a second discovering module 15, and a presentation module 16. The modules 11-16 include computerized code in the form of one or more programs that are stored in a non-transitory storage device 30 of the cloud device 1. The storage device 30 is a dedicated memory, such as an EPROM, a hard disk driver (HDD), or flash memory. The computerized code includes instructions that are executed by at least one processor 40 of the cloud device 1 to provide aforementioned functions of the network device discovery system 10.

Using the above-mentioned modules, the network device discovery system 10 generates a management list 20 for recording the registration information and a management status of each of the network devices which have been connected to the network 2. In one embodiment, the management list 20 includes a log of each of the registered network devices for recording device information, a pubic IP address, and a management status of each of the registered network devices. The management status includes a status which represents whether each of the registered network devices has been managed by a network manager. If one registered network device is managed by a network manager, the management status further includes identification information of the network manager.

Each of the network devices (only one network device shown in FIG. 2) includes an updating module. As shown in FIG. 2, a network device 7 includes an updating module 70. When the network device 7 sends registration information of the network device 7 for connecting to the network 2, and when the registration information (e.g. a public IP address) or a management status of the network device 7 is changed, the updating module 70 sends a request the cloud device 1 to update the registration information or the management status of the network device 7 in the management list 20.

If a specified network manager logged on a specified client device (e.g. a client device 5 in FIG. 2) requires to search for available network devices that can be managed by the specified network manager, the specified network manager may send a request of searching for available network devices to the cloud device 1. When the request of the specified network manager is received from the specified network device, the network device discovery system 10 retrieves specified network devices which managed by the specified network manager from the management list 20 to the specified client device. The network device discovery system 10 further searches for target network devices which have the same public IP addresses with the specified network devices, and presents one or more target network devices which have not been managed by any network manager to the specified client device for the specified network manager. A description of each module is given in the following paragraphs.

Figure 3:
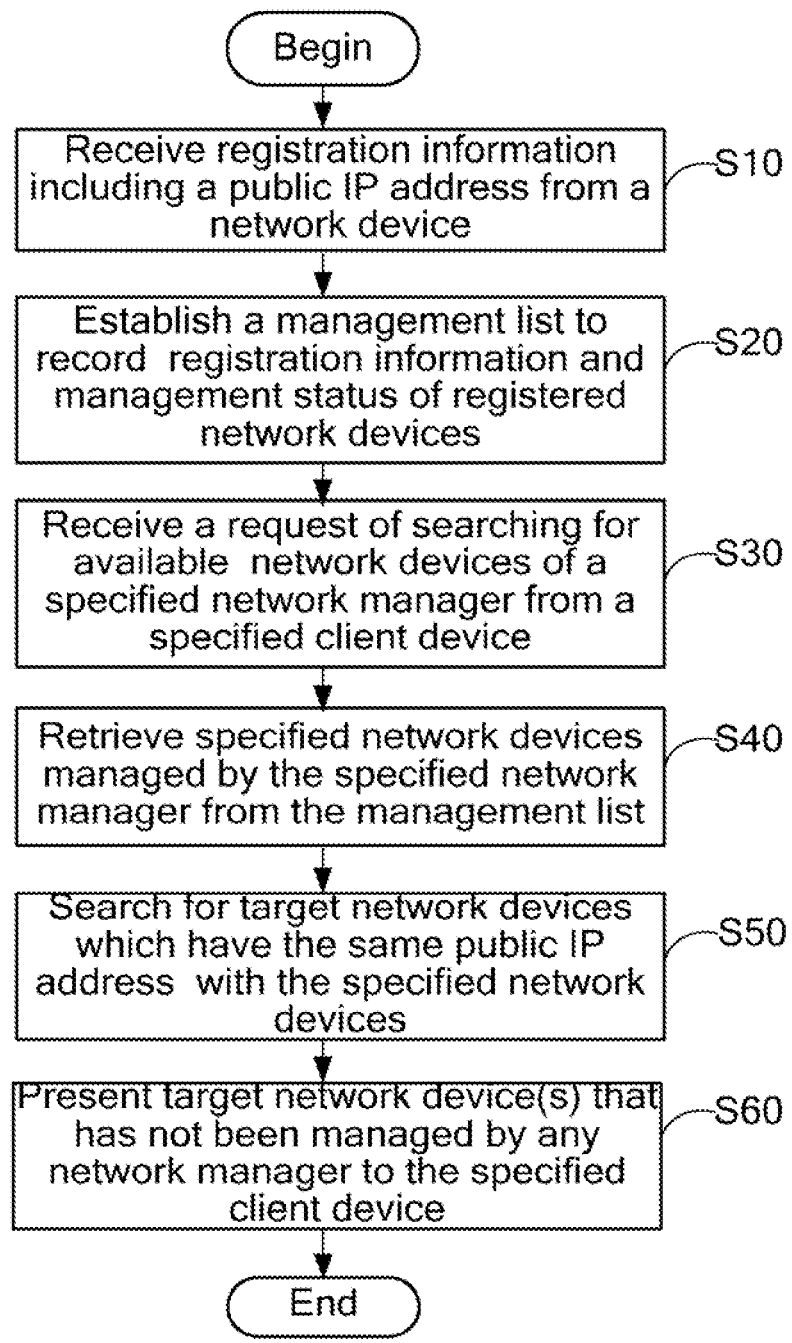
FIG. 3 is a flowchart of one embodiment of a method for discovering network devices using the cloud device of FIG. 2.

FIG. 3 is a flowchart of one embodiment of a method for controlling image capturing in the cloud device 1 of FIG. 2. Depending on the embodiment, additional steps may be added, others removed, and the ordering of the steps may be changed.

In step S10, the first receiving module 11 receives registration information from the network devices which have been registered to the cloud device 1 through the network 2. In one embodiment, the registration information of each of the registered network devices includes device information and a public IP address of each of the registered network devices.

In step S20, the recording module 12 records the registration information and a management status of each of the registered network devices in the management list 20. As mentioned above, the management status includes a status which represents whether each of the registered network devices has been managed by a network manager, and identification information of the network manager corresponding to each of the registered network devices.

In step S30, the second receiving module 13 receives a request of searching for available network devices of a specified network manager from a specified client device. In one embodiment, if the network manager "U1" logins on the client device 5, the network manager "U1" can search for the network devices in the network segment "A" that the client device 5 belongs to. Then the client device 5 may send the request to search the available network devices. In some embodiments, the client device 5 does not search for the network devices in other network segments.

In step S40, the first discovering module 14 retrieves specified network devices managed by the specified network manager from the management list 20 according to the identification information of the specified network manager. For example, the first discovering module 14 may retrieve the network devices a1~a5 in the network segment "A" and the network devices b8~b12 in the network segment "B" managed by the network manager "U1" as specified network devices. The first discovering module 14 further displays the specified network devices on a display device (not shown in FIG. 2) of the client device 5. In one embodiment, the target network devices may be displayed using a list, a chart, a table or other files.

In step S50, the second discovering module 15 searches for target network devices which have the same public IP addresses with the specified network devices in the management list 20. For example, if the public IP address of the specified network devices "a1~a5" retrieved by the first discovering module 14 is "M1", the second discovering module 15 determines target network devices "a8~a10" having the same public IP address "M1".

In step S60, the presentation module 16 presents one or more target network devices which have not been managed by any network manager to the specified client device for the specified network manager. If a specified network device "a10" in the specified network devices "a8~a10" is managed by a network manager "U2", the presentation module 16 eliminates the specified network device "a10", and presents target network devices "a8~a9" to the specified client device for the specified network manager.

In one embodiment, the one or more target network devices which have not been managed by any network manager is presented for the specified network manager by popping-up a prompt window or pushing a message on a display of the specified client device. The prompt window or the message may include information to indicate the target network devices, such as "Discovering network devices which have not been managed by any network manager, please determine whether it is needed to manage the discovered network devices by the network manager or not".

Furthermore, in other embodiments, the method further includes the following steps. The first receiving module 11 receives notifications of updating the device information or the management status from each of the registered network devices, and the recording module 12 updates the registration information or the management status of each of the registered network devices in the management list.

All of the processes described above may be embodied in, and fully automated via, functional code modules executed by one or more general purpose processors such as the processor 40. The code modules may be stored in any type of non-transitory readable medium or other storage device such as the storage device 30. Some or all of the methods may alternatively be embodied in specialized hardware. Depending on the embodiment, the non-transitory readable medium may be a hard disk drive, a compact disc, a digital versatile disc, a tape drive, or other suitable storage medium.

The described embodiments are merely examples of implementations, and have been set forth for a clear understanding of the principles of the present disclosure. Variations and modifications may be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. A method for discovering network devices using a cloud device, the cloud device being connected to one or more client devices and the network devices through a network, the method comprising:

receiving registration information from the network devices which have been registered to the cloud device through the network, converting private Internet Protocol (IP) addresses of the network devices into public IP addresses;

generating a management list for recording the registration information and a management status of each of the registered network devices, the management status comprising a status representing whether each of the registered network devices has been managed by a network manager, and identification information of the network manager which managed the each of the registered network devices;
receiving a request of searching for available network devices of a specified network manager from a specified client device;
retrieving specified network devices managed by the specified network manager from the management list according to identification information of the specified network manager;
searching for target network devices which have the same public Internet Protocol (IP) addresses as the specified network devices by comparing the public IP address of each specified network device with the public IP address of each registered network device; and
presenting one or more target network devices which have not been managed by any network manager to the specified client device for the specified network manager, and eliminating and not presenting target networks devices which have been managed by any other network manager.

2. The method according to claim 1, wherein the registration information of each of the registered network devices comprises device information and a public IP address of each of the registered network devices.

3. The method according to claim 2, wherein the management list comprises a log of each of the registered network devices for recording the device information, the pubic IP address, and the management status of each of the registered network devices.

4. The method according to claim 1, further comprising:
displaying specified network devices managed by the specified network manager on a display device of the specified client device.

5. The method according to claim 1, wherein the one or more target network devices which have not been managed by any network manager is presented to the specified network manager by popping-up a prompt window or pushing a message on a display of the specified client device.

6. The method according to claim 1, further comprising:
receiving notifications of updating the registration information or the management status from each of the registered network devices; and
updating the registration information or the management status of each of the registered network devices in the management list.

7. A cloud device, the cloud device being connected to one or more client devices and the network devices through a network, comprising:
at least one processor; and
a storage device storing one or more programs, when executed by the at least one processor, cause the at least one processor to perform operations of:
receiving registration information from the network devices which have been registered to the cloud device through the network, converting private Internet Protocol (IP) addresses of the network devices into public IP addresses;
generating a management list for recording the registration information and a management status of each of the registered network devices, the management status comprising a status representing whether each of the registered network devices has been managed by a network manager, and identification information of the network manager which managed the each of the registered network devices;
receiving a request of searching for available network devices of a specified network manager from a specified client device;
retrieving specified network devices managed by the specified network manager from the management list according to identification information of the specified network manager;
searching for target network devices which have the same public Internet Protocol (IP) addresses as the specified network devices by comparing the public IP address of each specified network device with the public IP address of each registered network device; and
presenting one or more target network devices which have not been managed by any network manager to the specified client device for the specified network manager, and eliminating and not presenting target networks devices which have been managed by any other network manager.

8. The cloud device according to claim 7, wherein the registration information of each of the registered network devices comprises device information and a public IP address of each of the registered network devices.

9. The cloud device according to claim 8, wherein the management list comprises a log of each of the registered network devices for recording the device information, the pubic IP address, and the management status of each of the registered network devices.

10. The cloud device according to claim 7, further comprising:
displaying specified network devices managed by the specified network manager on a display device of the specified client device.

11. The cloud device according to claim 7, wherein the one or more target network devices which have not been managed by any network manager is presented to the specified network manager by popping-up a prompt window or pushing a message on a display of the specified client device.

12. The cloud device according to claim 7, further comprising:
receiving notifications of updating the registration information or the management status from each of the registered network devices; and
updating the registration information or the management status of each of the registered network devices in the management list.

13. A non-transitory storage medium having stored thereon instructions that, when executed by at least one processor of a cloud device, cause the processor to perform a method for discovering network devices using the cloud device, the cloud device being connected to one or more client devices and the network devices through a network, the method comprising:
receiving registration information from the network devices which have been registered to the cloud device through the network, converting private Internet Protocol (IP) addresses of the network devices into public IP addresses;
generating a management list for recording the registration information and a management status of each of the registered network devices, the management status comprising a status representing whether each of the registered network devices has been managed by a network manager, and identification information of the network manager which managed the each of the registered network devices;

receiving a request of searching for available network devices of a specified network manager from a specified client device;

retrieving specified network devices managed by the specified network manager from the management list according to identification information of the specified network manager;

searching for target network devices which have the same public Internet Protocol (IP) addresses as the specified network devices by comparing the public IP address of each specified network device with the public IP address of each registered network device; and presenting one or more target network devices which have not been managed by any network manager to the specified client device for the specified network manager, and eliminating and not presenting target networks devices which have been managed by any other network manager.

14. The storage medium according to claim 13, wherein the registration information of each of the registered network devices comprises device information and a public IP address of each of the registered network devices.

15. The storage medium according to claim 14, wherein the management list comprises a log of each of the registered network devices for recording the device information, the pubic IP address, and the management status of each of the registered network devices.

16. The storage medium according to claim 13, further comprising:

displaying specified network devices managed by the specified network manager on a display device of the specified client device.

17. The storage medium according to claim 13, wherein the one or more target network devices which have not been managed by any network manager is presented to the specified network manager by popping-up a prompt window or pushing a message on a display of the specified client device.

18. The storage medium according to claim 13, further comprising:

receiving notifications of updating the registration information or the management status from each of the registered network devices; and updating the registration information or the management status of each of the registered network devices in the management list.

* * * * *